June 17, 1947.  W. DALTON  2,422,473

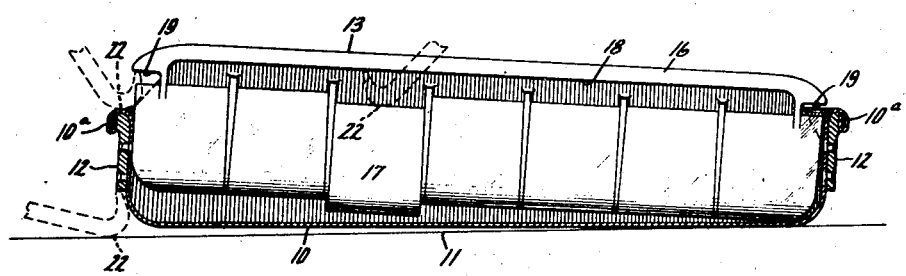
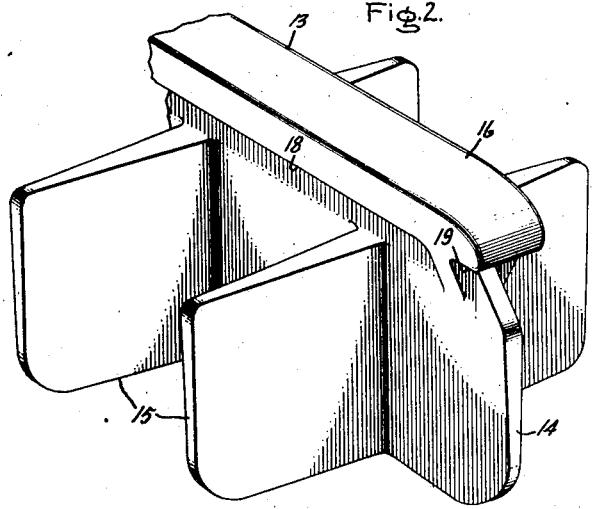
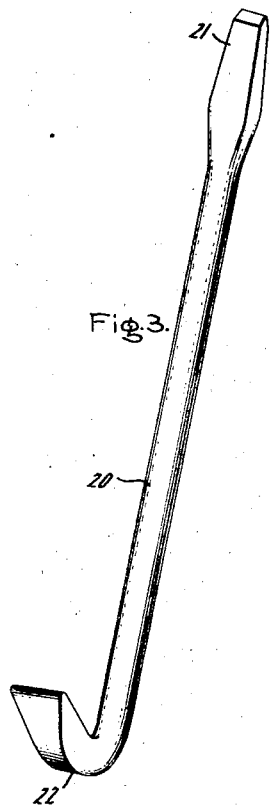

FREEZING TRAY

Filed Jan. 23, 1937  3 Sheets-Sheet 2

Inventor:
William Dalton,
by Harry E. Dunham
His Attorney.

June 17, 1947.　　　　W. DALTON　　　　2,422,473
FREEZING TRAY
Filed Jan. 23, 1937　　　　3 Sheets-Sheet 3
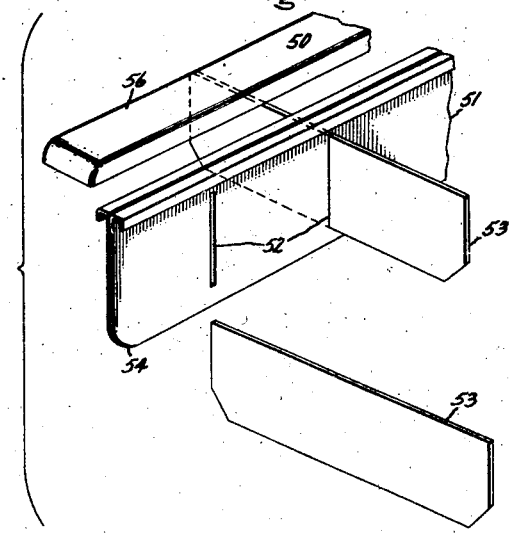
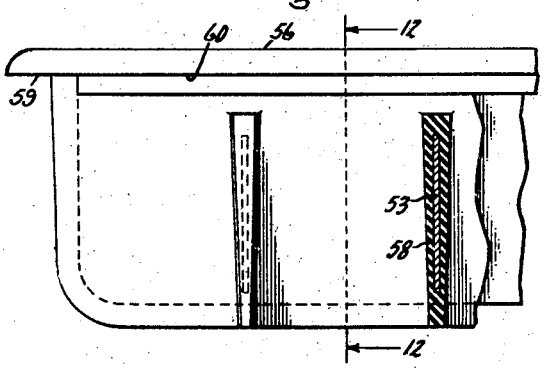
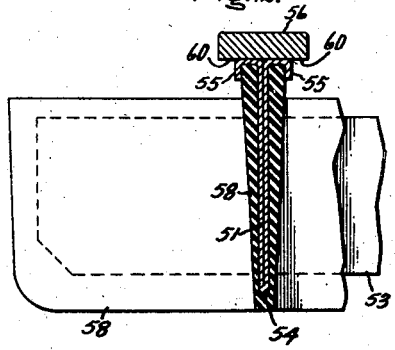
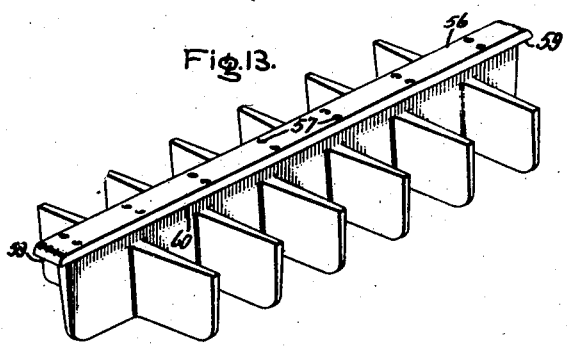
Inventor:
William Dalton,
by Harry E. Dunham
His Attorney.

Patented June 17, 1947

2,422,473

UNITED STATES PATENT OFFICE 2,422,473

FREEZING TRAY

William Dalton, Schenectady, N. Y., assignor to General Electric Company, a corporation of New York Application January 23, 1937, Serial No. 122,054

9 Claims. (Cl. 62—108.5)

My invention relates to freezing trays for refrigerating machines, and more particularly to dividers for such freezing trays.

Many types of mechanical refrigerating machines, and particularly those adapted for domestic use, are provided with a cooling unit adapted to receive freezing trays filled with water, ingredients for ice-cream, or other substances, to be frozen. These freezing trays are filled with the substance to be frozen and placed upon a surface of the cooling unit of the refrigerating machine until the substance is frozen.

A divider is commonly provided in freezing trays of this type in order to divide the same into a number of small compartments, so that the ice or other substance in the freezing tray will be frozen in the form of small blocks or cubes. The divider is preferably removable from the freezing tray to facilitate removal of the ice cubes therefrom. After the ice blocks or the like have been frozen in the freezing tray, the tray is removed from the cooling unit of the refrigerating machine, placed in water to thaw the ice blocks, and the divider and ice cubes contained therein are removed from the freezing tray. The ice blocks may then be individually removed from the divider for use as desired.

It is an object of my invention to provide a removable divider of simple construction and embodying an arrangement facilitating mechanical removal of ice cubes therefrom, without the necessity of thawing the ice cubes.

Further objects and advantages of my invention will become apparent as the following description proceeds, and the features of novelty which characterize my invention will be pointed out with particularity in the claims annexed to and forming a part of this specification.

Figure 4:
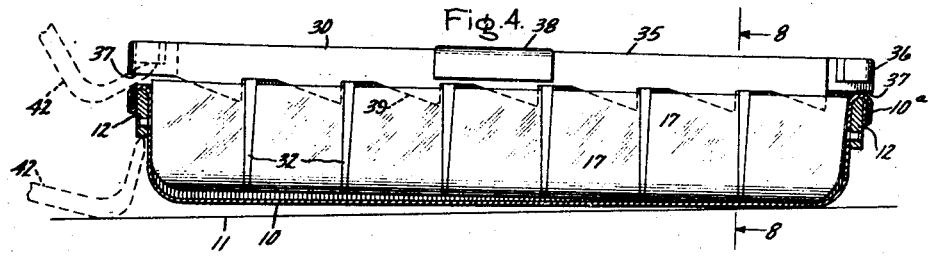
Figure 5:
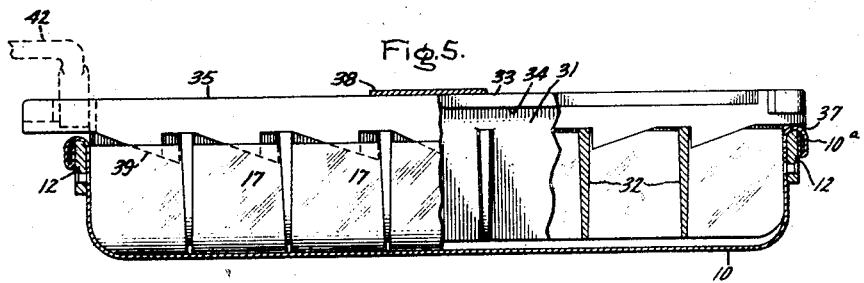
Figure 6:
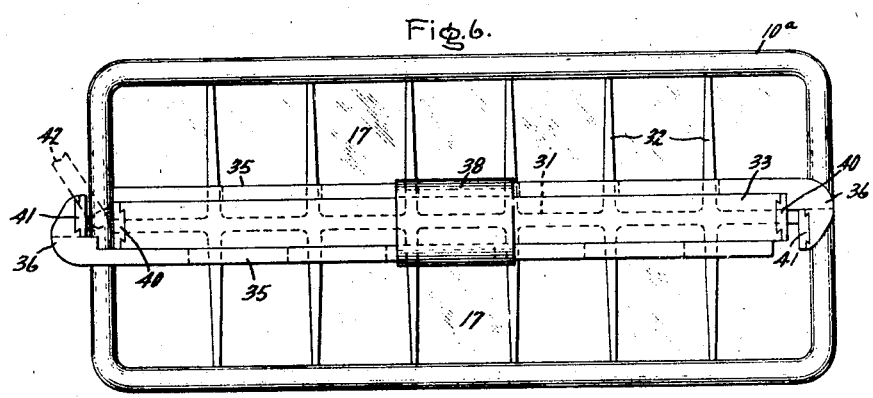
Figure 7:
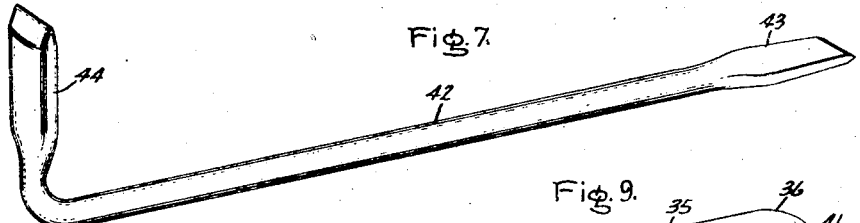
Figure 8:
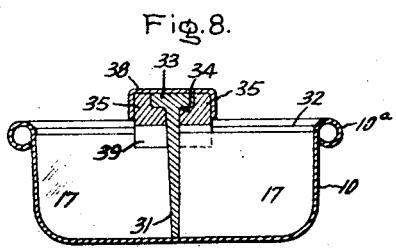
Figure 9:
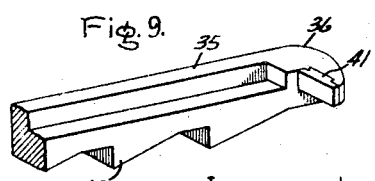

For a better understanding of my invention, reference may be had to the accompanying drawings in which Fig. 1 is a longitudinal sectional view of a freezing tray containing a divider embodying my invention; Fig. 2 is an enlarged fragmentary perspective view of the divider shown in Fig. 1; Fig. 3 is a perspective view of a bar employed in removing ice blocks from the divider; Fig. 4 is a longitudinal sectional view of a freezing tray containing a modified form of the divider and a slide carried by the divider for forcing ice blocks therefrom; Fig. 5 is a longitudinal sectional view, similar to Fig. 4, showing the operation of the slide; Fig. 6 is a plan view of the freezing tray and divider shown in Fig. 4; Fig. 7 is a perspective view of a bar employed in operating the slide carried by the divider; Fig. 8 is a sectional view along the line 8—8 of Fig. 4; Fig. 9 is an enlarged fragmentary perspective view of one of the slides carried by the divider shown in Figs. 4, 5, 6 and 8; Fig. 10 is an exploded fragmentary view of a further modified form of the divider; Fig. 11 is an enlarged fragmentary side elevational view, partly in section, of the divider shown in Fig. 10; Fig. 12 is a sectional view along the line 12—12 of Fig. 11; and Fig. 13 is a perspective view of reduced size illustrating the divider shown in Fig. 10.

Referring to the drawings, in Fig. 1 I have shown a shallow rectangular metal freezing tray 10 arranged on a supporting surface 11 of a suitable cooling unit of a refrigerating machine. The freezing tray 10 is reinforced at each end to provide a shoulder at the upper edge thereof by rigidly securing a plate 12 to the end of the freezing tray just below the downwardly extending rim 10a provided about the open top thereof. The freezing tray 10 contains a divider 13 which is preferably made by casting a metal of high thermal conductivity such as aluminum.

As will be seen in Fig. 2, the divider 13 comprises a continuous longitudinal partition element 14, a plurality of transverse partition elements 15, and a member 16 extending along the upper edge of the longitudinal partition element 14. The partition elements 14 and 15 cooperate to form ice block compartments on each side of the divider which contain ice blocks 17. Preferably, the partition elements are of tapered cross-section, increasing in thickness from the bottom towards the top, to facilitate ready removal therefrom, in a downwardly direction, of the ice blocks 17. The member 16 serves to reinforce the divider 13 and is provided with flanges extending from the longitudinal partition element 14 over the ice block compartments and constituting shoulders 18 on each side of the member which facilitate removal of the ice blocks 17 from the divider. The member 16 also extends from the longitudinal partition element 14 at each end thereof to provide, together with portions cut away from the longitudinal partition element, shoulders 19 at each end of the divider. These shoulders 19 are employed in removing the divider 13 from the freezing tray 10.

A rigid element or bar 20 provided with a straight flattened end 21 and a curved flattened end 22, shown in Fig. 3, is employed in removing the divider from the freezing tray and in removing the ice blocks from the divider. After the water placed in the freezing tray 10 has been frozen into the ice blocks 17, the freezing tray is removed from the cooling unit of the refrigerating machine by the bar 20 which constitutes a lever. The curved end 22 of the bar 20 is placed between the supporting surface 11 of the cooling unit and the reinforcing plate 12 provided on the end of the freezing tray 10, as shown in dotted lines in Fig. 1. The bar is then swung downwardly to cause the curved end 22 thereof to break the frozen bond between the freezing tray 10 and the supporting surface 11 of the cooling unit. The freezing tray 10 and the divider 13 contained therein is then removed from the cooling unit. The divider 13 carrying the ice blocks 17 is then separated or removed from the freezing tray 10 by placing an end of the bar 20 between the shoulder on one of the reinforced ends of the freezing tray 10 and one of the shoulders 19 provided on the divider by the member 16 extending along the upper edge of the longitudinal partition element 14. The bar 20 is then swung downwardly causing the end thereof to exert a force between the reinforced end of the freezing tray 10 and the divider 13, which breaks the divider and ice blocks carried thereby away from the freezing tray. Each of the ice blocks 17 is individually separated or removed from the divider 13 by placing the curved end 22 of the bar 20 between the top surface of an ice block 17 and the shoulder 18 thereabove, provided on the member 16. The bar 20 is then swung downwardly causing the curved end 22 thereof to exert a downward force upon the top surface of the ice block 17, thereby readily breaking a frozen bond between the ice block 17 and the divider 13 and forcing the ice block 17 from the divider 13 due to the tapered construction of the partition elements. As many ice blocks as are desired may be removed from the divider without thawing the ice blocks, or all of the ice blocks may be removed from the divider and collected in the freezing tray 10.

In Fig. 4, I have shown a freezing tray 10 of the construction previously described, containing a modified form of the divider, designated generally by the numeral 30. This divider is also preferably made by casting a metal of high thermal conductivity. The divider 30 comprises a continuous longitudinal partition element 31, a plurality of transverse partition elements 32, and a member 33 arranged along the upper edge of the longitudinal partition element 31 above the ice block compartments, as best shown in Figs. 5, 6 and 8. Preferably, the partition elements 31 and 32 are of tapered cross-section, increasing in thickness from the bottom towards the top, to facilitate ready removal therefrom, in a downwardly direction, of the ice blocks 17. The member 33 is preferably cast integral with the divider and serves to reinforce the divider 30. The member 33 is provided with flanges extending from the longitudinal partition element 31 over the ice block compartments formed by the partition elements and constituting shoulders 34 on each side of the member. An element or slide 35 of elongated form and substantially L-shaped cross-section is slidably carried on each side of the member 33 by the shoulders 34 formed thereon and extends longitudinally over a plurality of the ice block compartments. These slides may also be made by casting a suitable metal, or in any other convenient manner. The slides 35 are provided with curved ends 36 which extend over the reinforced ends of the freezing tray 10 and constitute shoulders 37 to facilitate removal of the divider 30 from the freezing tray. The slides 35 are secured to the member 33 in sliding engagement with the shoulders 34 thereon by a U-shaped sheet metal clip 38 embracing the sides of the slides. A plurality of equally spaced wedges or projections having inclined faces 39 are provided along the lower edge of each of the slides 35 in contact with the upper surfaces of the ice blocks 17. The spacing of the wedges 39 on the slides 35 corresponds to the spacing of the transverse partition elements 32.

As will be seen in Figs. 6 and 9, the curved end 36 of each of the slides 35 extends about an end of the member 33. A steel insert 40 is provided on each end of the member 33 and a steel insert 41 is provided on the inside face of the curved end 36 of each of the slides 35 in longitudinal alignment with the steel inserts 40. Normally the slides 35 occupy retracted positions as shown in Fig. 4. In the retracted positions of the slides 35 the curved ends 36 overlie the reinforced ends of the freezing tray 10, and the wedges 39 occupy positions adjacent the transverse partition elements 32. The slides 35 can be moved longitudinally with respect to the member 33 by an element or bar 42, which is provided with a straight flattened end 43 and an angularly projecting flattened end 44, as shown in Fig. 7.

In using this freezing tray, the divider 30 is placed in the tray, and the tray is filled with water until the major portion of the wedges 39 are covered with water. The freezing tray is then placed upon the supporting surface 11 of a cooling unit and the water is frozen into ice blocks 17. The freezing tray is then removed from the cooling unit by placing the end 44 of the bar 42 between the supporting surface 11 of the cooling unit and the reinforcing plate 12 on the end of the freezing tray 10. The bar is then swung downwardly to cause the end 44 thereof to break the frozen bond between the freezing tray 10 and the supporting surface 11 of the cooling unit. The freezing tray 10 and the divider 30 contained therein is then removed from the cooling unit. The divider 30 with the ice blocks 17 therein is then separated or removed from the freezing tray 10 by placing an end of the bar 42 between the shoulder on one of the reinforced ends of the freezing tray 10 and one of the shoulders 37 provided on the divider by the curved ends 36 of the slides 35. The bar is then swung downwardly causing the end thereof to exert a force between the reinforced end of the freezing tray 10 and the divider 30, which breaks the divider and ice blocks carried thereby away from the freezing tray. The angularly projecting flattened end 44 of the bar 42 is then placed between the steel insert 40 carried by one end of the member 33 and the steel insert 41 carried by the curved end 36 of one of the slides 35. The bar is then swung in a horizontal plane causing the slide 35 to be slid longitudinally along the member 33. The sliding movement of the slide 35 causes the wedges 39 provided along the lower edge thereof to exert a downward force upon the top surfaces of the ice blocks 17 carried by one side of the divider 30, thereby breaking a frozen bond between the ice blocks 17 and the divider and forcing the ice blocks from one side of the divider. The ice blocks 17 carried by the other side of the divider are removed in a similar manner by sliding the other slide 35 longitudinally along the member 33. The slides together with the wedges thereon thus serve as rigid elements for exerting force between the reinforcing member 33 and the tops of the ice blocks.

In Fig. 10, I have shown a further modified form of the divider designated generally by the numeral 50. This construction forms the subject matter of my divisional application Serial No. 307,998, filed December 7, 1939. The divider 50 includes a continuous longitudinal metal partition element 51 provided with a number of equally spaced slots 52 along its length. A plurality of transverse metal partition elements 53 are passed through the slots 52 in the longitudinal partition element 51 and secured in place. The longitudinal partition element 51 is formed of a metallic sheet bent upon itself at 54, as will be seen in Fig. 12. The edges 55 of the sheet opposite the bend 54 are flanged outwardly in opposite directions, and a reinforcing member 56 is rigidly secured to the flanged edges 55 of the sheet along its length by spot welding as indicated at 57 in Fig. 13. The partition elements 51 and 53 constitute a core and are provided with a suitable covering 58, which preferably is of tapered cross-section, increasing in thickness from the bottom towards the top, to facilitate ready removal therefrom of ice blocks. Preferably, the covering 58 is made of a water-resistant plastic composition, such as rubber or other suitable water-resistant material, and is moulded around the metallic core.

The reinforcing member 56 extends from the longitudinal partition element 51 at each end thereof to provide shoulders 59 at each end of the divider. The member 56 is provided with flanges extending from the longitudinal partition element 51 over the ice block compartments formed by the partition elements and constituting shoulders 60 on each side of the reinforcing member.

The divider 50 is separated or removed from a freezing tray in which it is carried, and ice blocks carried by the divider 50 are separated or removed therefrom, by an element or bar cooperating with the shoulders 59 and 60, respectively, provided on the reinforcing member 56, in a manner similar to that described in connection with the form of the divider shown in Fig. 1.

It will be evident from the foregoing that I have provided a divider of reinforced construction, embodying an arrangement facilitating removal of the divider from a freezing tray and facilitating removal of ice blocks from the divider.

While I have shown and described certain embodiments of my invention, other modifications will be apparent to those skilled in the art, and I do not, therefore, desire my invention to be limited to the particular constructions shown and described, and I intend in the appended claims to cover all modifications within the spirit and scope of my invention.

What I claim as new and desire to secure by Letters Patent of the United States:

1. A removable divider for freezing trays comprising a longitudinal partition element, a plurality of transverse partition elements carried by said longitudinal partition element and adapted to cooperate therewith and with a freezing tray to form ice block compartments, a member extending along the upper edge of said longitudinal partition element, said member having a shoulder extending over said compartments, and means including a slide carried by said shoulder for breaking a frozen bond between an ice block disposed in one of said compartments and said partition elements.

2. A removable divider for freezing trays comprising a longitudinal partition element, a plurality of transverse partition elements carried by said longitudinal partition element and adapted to cooperate therewith and with a freezing tray to form ice block compartments, a member extending along the upper edge of said longitudinal partition element, said member having a shoulder extending over said compartments, a slide carried by said shoulder, said slide being provided with a plurality of wedges adapted to engage corresponding ice blocks carried in said compartments, and means including said slide for breaking a frozen bond between an ice block disposed in one of said compartments and said partition elements.

3. In combination with a removable divider for freezing trays comprising a longitudinal partition element and a plurality of transverse partition elements carried by said longitudinal partition element and adapted to cooperate therewith and with a freezing tray to form ice block compartments, a slide carried by the top of said divider and having an inclined face adapted to directly engage the top surface of an ice block carried in one of said compartments, and means including said slide for breaking a frozen bond between an ice block disposed in one of said compartments and said partition elements.

4. A removable divider for freezing trays comprising a longitudinal partition element, a plurality of transverse partition elements carried by said longitudinal partition element and adapted to cooperate therewith and with a freezing tray to form ice block compartments on each side thereof, a member extending along the upper edge of said longitudinal partition element, said member having a shoulder on each side thereof extending over said compartments, a slide carried on each side of said member by said shoulders, each of said slides being provided with a plurality of wedges adapted to engage corresponding ice blocks carried in said compartments, and means including said slides for breaking frozen bonds between ice blocks disposed in said compartments and said partition elements.

5. A removable divider for freezing trays comprising a plurality of partition elements adapted to cooperate with a freezing tray to form ice block compartments, and means for forcing ice blocks from said compartments, said means including an elongated element slidably carried by the top of said divider and extending longitudinally of said divider over a plurality of said compartments.

6. A removable divider for freezing trays comprising a longitudinal partition element, a plurality of transverse partition elements carried by said longitudinal partition element and adapted to cooperate therewith and with a freezing tray to form ice block compartments, and means for forcing ice blocks from said compartments, said means including an elongated element slidably carried by the top of said longitudinal partition element and extending along said longitudinal partition element over a plurality of said compartments.

7. A removable divider for freezing trays comprising a longitudinal partition element, a plurality of transverse partition elements carried by said longitudinal partition element and adapted to cooperate therewith and with a freezing tray to form ice block compartments, a member extending along the upper edge of said longitudinal partition element, and means for breaking a frozen bond between an ice block disposed in one of said compartments and said partition elements, said means including an elongated element slidably carried by said member and extending longitudinally of said member over a plurality of said compartments.

8. A removable divider for freezing trays comprising a plurality of partition elements adapted to cooperate with a freezing tray to form ice block compartments, and means for breaking a frozen bond between an ice block disposed in one of said compartments and said partition elements, said means including an elongated element slidably carried by the top of said divider and extending longitudinally of said divider over a plurality of said compartments.

9. A removable divider for freezing trays comprising a longitudinal partition element, a plurality of transverse partition elements carried by said longitudinal partition element and adapted to cooperate therewith and with a freezing tray to form ice block compartments, and means for breaking a frozen bond between an ice block disposed in one of said compartments and said partition elements, said means including an elongated element slidably carried by the top of said longitudinal partition element and extending along said longitudinal partition element over a plurality of said compartments.

WILLIAM DALTON.

REFERENCES CITED

The following references are of record in the file of this patent:

UNITED STATES PATENTS

| Number | Name | Date |
|---|---|---|
| 1,802,190 | Wardman | Apr. 21, 1931 |
| 1,956,761 | Fuller | May 1, 1934 |
| 2,009,803 | Hallock | July 30, 1935 |
| 2,035,543 | Gaugler | Mar. 31, 1936 |
| 2,037,364 | Brownstein | Apr. 14, 1936 |
| 2,037,517 | Saler | Apr. 14, 1936 |
| 1,958,392 | Hofferberth | May 8, 1934 |
| 2,093,856 | Wales | Sept. 21, 1937 |
| 2,098,924 | Newill | Nov. 9, 1937 |
| 1,879,400 | Mitchell | Sept. 27, 1932 |